United States Patent [19]

Dufour

[11] 4,361,666

[45] Nov. 30, 1982

[54] STYRENIC POLYMER ADDITIVE

[75] Inventor: Daniel L. Dufour, Longmeadow, Mass.

[73] Assignee: Monsanto Company, St. Louis, Mo.

[21] Appl. No.: 336,747

[22] Filed: Jan. 4, 1982

[51] Int. Cl.$^3$ .............................................. C08L 35/06
[52] U.S. Cl. .................................................. 524/295
[58] Field of Search .......................................... 524/295

[56] References Cited

U.S. PATENT DOCUMENTS 4,028,482 6/1977 Ueshima et al. ..................... 525/387
4,317,760 3/1982 Tsuda et al. ......................... 524/295

FOREIGN PATENT DOCUMENTS 40-7026984 11/1965 Japan ................................... 524/295

*Primary Examiner*—Joseph L. Schofer
*Assistant Examiner*—N. Sarofim
*Attorney, Agent, or Firm*—William J. Farrington; Paul D. Matukaitis; Arnold H. Cole

[57] ABSTRACT

Styrene/maleic anhydride copolymers and their polyblends can be plasticized using an ester of an aromatic carboxylic acid, which may be halogenated, and a $C_{10}$ to $C_{24}$ alkyl alcohol having a melting point of at least 50° C.

6 Claims, No Drawings

STYRENIC POLYMER ADDITIVE

This invention relates to additives for styrenic polymers and particularly to additives that impart improved flow properties to the polymers.

BACKGROUND OF THE INVENTION

It is known that styrenic polymers conventionally require a flow aid to improve the ease with which they may be molded or extruded. This is particularly true where the styrenic polymer comprises a comonomer such as acrylonitrile or maleic anhydride. The effect of the additive is to improve the melt flow of the polymer at a given temperature. This can therefore be used to reduce the temperature at which the polymer may be molded or extruded or, more usually, to improve the ease with which the polymer is molded so as to get better, more uniform quality moldings. As a rule however this results in a deterioration of one or more of the physical properties of the polymer. Thus the incorporation of a flow aid often results in reduced Izod impact and distortion temperature under load, (DTUL).

DISCUSSION OF PRIOR ART

Styrenic polymers are conveniently compounded with one of a varity of flow aids. The 1981-2 edition of "Modern Plastics Encyclopedia" lists around a hundred additives that can be used to plasticize polystyrene for example. These include esters such as adipates, benzoic acid esters, citrate esters, glutarate esters, hydrocarbons such as mineral or vegetable oils, phthalate esters, chlorinated paraffins, phosphate esters and stearate esters. However not all are equivalent or indeed suitable for many formulations. Thus the quest for a flow aid usually is resolved into a search for the one that does the least harm to the particular balance of properties most prized in the polymer formulation under development.

DESCRIPTION OF THE INVENTION

The polymer compositions of the present invention are based on copolymers comprising a vinylaromatic monomer and an ethylenically unsaturated dicarboxylic acid anhydride. Such copolymers can, if desired be blended with another polymeric component such as an ABS (acrylonitrile/butadiene/styrene) copolymer, an MBS (methyl methacrylate/butadiene/styrene) copolymer, polyvinyl chloride, a polyphenylene ether, a polycarbonate or any other compatible polymer or mixture of such polymers.

The inclusion of an ethylenically unsaturated dicarboxylic acid anhydride monomer in a vinylaromatic polymer has the effect of significantly improving the DTUL of the polymer. The effect can be expressed as about $1\frac{1}{2}°$ C. improvement in DTUL for each percentage of the anhydride, up to about 35% by weight, based on the polymer in the absence of the anhydride. This improvement in DTUL is very significant for such polymers and blends containing them. It is therefore critical that any flow improver used has as little impact as possible on this critical feature. An additive has now been discovered that not only essentially preserves the DTUL but actually improves the impact strength and other useful properties.

The invention therefore provides a polymer composition comprising a copolymer of a vinylaromatic monomer and an ethylenically unsaturated dicarboxylic acid anhydride, and a minor proportion of an ester having the formula

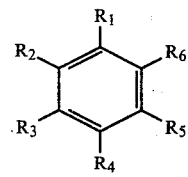

wherein from 1 to 4 of $R_1$, $R_2$, $R_3$, $R_4$, $R_5$ and $R_6$ are —COOR groups in which R is a substituted or unsubstituted group having from 10 to 24 carbon atoms, and the remainder are selected from hydrogen, alkyl, chlorine and bromine, said ester having a melting point above about 50° C.

The polymeric component comprises a vinylaromatic monomer and an ethylenically unsaturated dicarboxylic acid anhydride component and it is understood that these terms embrace, respectively, monomers such as styrene, alpha-methyl styrene, para-methyl styrene, chlorostyrene and the like, and monomers such as maleic anhydride, itaconic anhydride, aconitic anhydride and citraconic anhydride. For convenience sake these groups of monomers will henceforth be designated by the preferred exemplars: styrene and maleic anhydride. The copolymer can if desired comprise a minor proportion, for example up to 20% by weight of a copolymerizable termonomer such as an acrylate or methacrylate ester or an unsaturated nitrile such as acrylonitrile.

As indicated above it is foreseen that advantageous composition might comprise other polymers compatible with the above polymeric component.

The esterifying groups of the ester are substituted or unsubstituted $C_{10}$ to $C_{24}$ carbon atom alkyl groups. Suitable alkyl groups include decyl, dodecyl, tetradecyl, cetyl, hexadecyl (palmityl), octadecyl (stearyl) and carnaubyl. Preferred alkyl groups are unsubstituted alkyl groups such as palmityl and stearyl groups.

The acid component of the ester can be for example benzoic acid, phthalic acid, terephthalic acid, trimellitic acid as well as the ring-halogenated or alkyl substituted equivalents. The phthalate esters are preferred.

The ester may comprise any number of nuclear halogen substituents from 0 to 5 and mixed substituents may of course be used. In general however tetra-substituted diester additives are preferred. The —COOR groups are preferably two in number and most are advantageously located either ortho or para to one another with the ortho position preferred when the other nuclear positions bear halogen atoms.

The halogen selected for optimum performance depends to some extent on the role the additive is to fulfill. As a plasticizer, the better performance is obtained using the tetrachloro-diester derivative. However if in addition the additive is expected to confer some degree of flame retardance, the tetrabromo-diester or the pentabromomonoester derivative is preferred.

The amount of the ester additive used is also determined to some extent by its function. As a plasticizer an amount of from 0.5 to 10% based on the total composition weight is adequate. If the function to be filled is that of a flame retardant/plasticizer then larger amounts, for example up to 20% of the total composition weight, may be appropriate.

It is found that esters with a melting point below about 50° C. have a deleterious effect on the heat distortion temperature of the polymer and for that reason are excluded. Preferably the ester has a melting point of at least 60° C.

The composition can also comprise other additives and components (besides those described above), such as additional flame retardants, antioxidants, fillers, pigments, anti-static additives, stabilizers and the like.

DESCRIPTION OF PREFERRED EMBODIMENTS

The invention is now more fully described by reference to the following examples which illustrate the effectiveness of the ester additives in styrene/maleic anhydride polymer formulations.

The polymer formulations tested each comprised a styrene/maleic anhydride/methyl methacrylate with the monomers in weight proportions of 68/24/8 respectively. This is referred to in the SMA polymer in the Examples below.

Certain of the Examples also used an ABS polymer comprising styrene, acrylonitrile and a butadiene rubber in the approximate weight proportions 56/17/27.

In the Examples the additive named was blended with the polymeric components and the physical properties of the plasticized polymeric composition were evaluated.

The test methods used in each case were as follows:

| | |
|---|---|
| Izod Impact (J/m. notch) | ASTM D-256.56 |
| DTUL (°C.) | ASTM D-648.56 |
| Tensile Stress at yield (mPa) | ASTM D-638 |
| Tensile Stress at fail (mPa) | ASTM D-638 |
| Elongation at fail (%) | ASTM D-638 |

The Falling Dart Impact (FDI) tests is performed using a weighted dart with a diameter of 38 mm and a free full distance of 66.6 cm. The sample under test is a chip 100 mm×75 mm×2.6 mm in dimensions. The weight of the dart is increased until 50% of the specimens tested using that weight fail by showing cracking of the sample in the area impacted by the dart head. The measuremen in joules indicating the total energy required to cause failure at this level.

"Sidewinder flow" is a comparative test of the polymer flow characteristics. In the test the polymer is injected into a generally sinusoidal mold under given injection pressure, temperature and shot-time conditions. The distance (in mm.) along the mold reached by the polymer is an indication of the readiness with which it flows by comparison with other polymers tested under the same conditions.

Four pressures and four flow times were used to measure viscosities. The viscosity was calculated from this data using the technique described in "Automatic Capillary Rheometer, Instruction Manual for Model3501-H" published by Monsanto Research Corp., (April 1972 Edition). The viscosity used in each case is the value at 100 sec.$^{-1}$ and a rheometer set temperature of 246° C.

The additives used were as follows:
Distearyl terephthalate—(Melting Point>69° C.).
Distearyl tetrachloroterephthalate—DSTCP (Melting Point>69° C.)
Distearyl tetrabromoterephthalate—DSTBP (Melting Point>69° C.)
Butyl Stearate (comparison)—BS
Acrawax C (comparison)—A-Wax

EXAMPLE 1

This Example evaluates the effect of various additives in a blend of 45% by weight of the SMA polymer and 55% of the ABS polymer. The results are set forth in Table 1 below.

TABLE 1

| | PROPERTIES OF BLENDS | | | | | |
|---|---|---|---|---|---|---|
| Additive/ Property | None | 1% BS | 1% DSTCP | 2% DSTCP | 3% DSTCP | 5% DSTCP |
| Izod (at 23° C.) (J/m notch) | 162 | 183 | 172 | 179 | 192 | 204 |
| FDI (at 23° C.) (J) | 47.5 | 47.5 | 46.1 | 58.3 | 54.2 | 66.4 |
| DTUL °C. (1.27 cm × 1.27 cm un-annealed bars) | 111.6 | 109.3 | 110.4 | 111.7 | 110.8 | 109.1 |
| DTUL °C. (1.27 cm × 1.27 annealed bars) | 123.0 | 121.0 | 121.4 | 122.1 | 120.4 | 120.3 |
| Tensile (yield) (mPa) | 37.6 | 33.7 | — | 35.0 | 33.9 | 31.5 |
| Tensile (fail) (mPa) | 36.3 | 33.6 | — | 33.7 | 31.6 | 28.1 |
| Sidewinder flow (mm) | 346 | 354 | 348 | 354 | 358 | 373 |

As can be seen from Table 1, at a level of 2% of the DSTCP (about the molar equivalent of 1% BS and the level at which equivalent flow improvement is obtained) the properties, especially the impact strength properties, are significantly improved over the unmodified or BS-modified polyblend. What is more this was achieved with no significant sacrifice in DTUL.

EXAMPLE 2

This Example shows the properties of blends of the SMA polymer and ABS polymer (in 50/50 weight percentage ratios) with various additives. The results are reported in Table 2 below.

TABLE 2

| | PROPERTIES OF BLENDS | | | | |
|---|---|---|---|---|---|
| Additive/ Property | 1% BS (799-11) | 2% A-Wax (799-4) | 2% DST (799-6) | 2% DSTCP (799-1) | 2% DSTBP (799-3) |
| Izod (23° C.) (J/m notch) | 173.6 | 162.7 | 179.0 | 173.5 | 173.5 |
| FDI (23° C.) | 43.4 | 39.3 | 51.5 | 46.1 | 43.4 |

TABLE 2-continued

| Additive/Property | 1% BS (799-11) | 2% A-Wax (799-4) | 2% DST (799-6) | 2% DSTCP (799-1) | 2% DSTBP (799-3) |
|---|---|---|---|---|---|
| (J) DTUL °C. Unannealed (1.27 × 1.27 cm bars) | 113.7 | 113.1 | 114 | 115.3 | 114.2 |
| Tensile (yield) (mPa) | 34.8 | 37.1 | 36.3 | 35.6 | 36.5 |
| Tensile (fail) (mPa) | 34.2 | 36.0 | 34.1 | 33.3 | 34.2 |
| Elongation at fail (%) | 33 | 35 | 41 | 36 | 26 |
| Viscosity | 13.9 | — | 13.5 | 13.9 | 14.6 |

From the above it can be seen that, in addition to DSTCP, DSTBP and DST also perform well as plasticizers and in many respects outperform known effective plasticizers such as butyl stearate and Acrawax C.

EXAMPLE 3

This Example illustrates the use of additives according to the invention with the SMA polymer in the absence of any ABS component. The results are reported in Table 3 below.

TABLE 3

| Additive/Property | 2% BS | 2% DSTCP |
|---|---|---|
| Izod (23° C.) (J/m notch) | 18.4 | 19 |
| DTUL (°C.) (Unannealed - 1.27 × 1.27 cm. bars) | 135.3 | 137 |
| Tensile (fail) (mPa) | 36.0 | 36.6 |

TABLE 3-continued

| Additive/Property | 2% BS | 2% DSTCP |
|---|---|---|
| Elongation at fail | 2.3 | 2.4 |

What is claimed is:

1. A polymer composition comprising a copolymer of a vinyl aromatic monomer and an ethylenically unsaturated dicarboxylic acid anhydride and minor proportion of a ester having the formula:

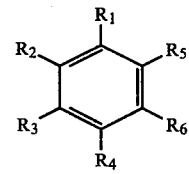

wherein from 1 to 4 of $R_1$, $R_2$, $R_3$, $R_4$, $R_5$ and $R_6$ are —COOR groups in which R is a substituted or unsubstituted alkyl group having from 10 to 24 carbon atoms, and the remainder are selected from hydrogen, alkyl, chlorine and bromine, said ester having a melting point of at least 50° C.

2. A polymer composition according to claim 1 in which the ester is a diester of a phthalic acid.

3. A polymer composition according to claim 2 in which the diester is selected from the group consisting of di-stearyl tetrabromophthalate, distearyl tetrachlorophthalate and distearyl terephthalate.

4. A polymer composition according to claim 1 comprising from 0.5 to 20% by weight of the ester additive.

5. A polymer composition according to claim 1 in which the ester has a melting point of at least 60° C.

6. A polymer composition according to any one of claims 1 to 5 which additionally comprises from 10 to 75% by weight, based on the total composition of weight, a second polymeric component selected from the group consisting of acrylonitrile/butadiene/styrene copolymers; methyl methacrylate/butadiene/styrene copolymers; polycarbonates; polyphenylene ethers; polyvinyl chloride, polyamides, polyesters and mixtures of such polymers.

* * * * *